(12) United States Patent
Cloft

(10) Patent No.: US 8,082,726 B2
(45) Date of Patent: Dec. 27, 2011

(54) TANGENTIAL ANTI-SWIRL AIR SUPPLY

(75) Inventor: Thomas G. Cloft, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 923 days.

(21) Appl. No.: 11/768,240

(22) Filed: Jun. 26, 2007

(65) Prior Publication Data

US 2009/0000272 A1     Jan. 1, 2009

(51) Int. Cl.
 *F02K 3/02*        (2006.01)
(52) U.S. Cl. ........ 60/226.1; 60/785; 244/53 B; 137/15.1
(58) Field of Classification Search ............ 60/782, 60/785, 226.1, 262, 39.093; 137/15.1, 15.2; 244/134 R, 134 B, 134 C, 53 B; 415/144, 415/145, 58.5, 57.1, 57.3, 57.4
See application file for complete search history.

(56) References Cited

U.S. PATENT DOCUMENTS

| | | | | |
|---|---|---|---|---|
| 3,572,960 | A * | 3/1971 | McBride | 415/115 |
| 3,735,593 | A * | 5/1973 | Howell | 60/226.1 |
| 4,083,181 | A | 4/1978 | Adamson | |
| 4,086,761 | A | 5/1978 | Schaut et al. | |
| 4,156,344 | A * | 5/1979 | Cuthbertson et al. | 60/226.1 |
| 4,199,295 | A * | 4/1980 | Raffy et al. | 415/115 |
| 4,757,963 | A * | 7/1988 | Cole | 244/134 B |
| 4,993,663 | A | 2/1991 | Lahti et al. | |
| 5,205,513 | A * | 4/1993 | Schilling | 244/54 |
| 5,308,225 | A * | 5/1994 | Koff et al. | 415/57.3 |
| 5,357,742 | A * | 10/1994 | Miller | 60/785 |
| 5,607,284 | A * | 3/1997 | Byrne et al. | 415/58.5 |
| 5,732,547 | A * | 3/1998 | Olsen et al. | 60/204 |
| 5,743,493 | A * | 4/1998 | McCaughan | 244/130 |
| 5,782,077 | A * | 7/1998 | Porte | 60/782 |
| 6,125,626 | A * | 10/2000 | El-Aini et al. | 60/226.1 |
| 6,267,328 | B1 | 7/2001 | Vest | |
| 6,295,803 | B1 | 10/2001 | Bancalari | |
| 6,360,989 | B1 * | 3/2002 | Maguire | 244/53 B |
| 6,390,418 | B1 | 5/2002 | McCormick et al. | |
| 6,438,941 | B1 | 8/2002 | Elliott et al. | |
| 6,546,734 | B2 * | 4/2003 | Antoine et al. | 60/772 |
| 6,662,546 | B1 | 12/2003 | Giffin, III | |
| 6,868,664 | B2 | 3/2005 | Albero et al. | |
| 7,114,519 | B2 | 10/2006 | Aitchison et al. | |
| 7,631,483 | B2 * | 12/2009 | Mani et al. | 60/226.1 |
| 7,766,280 | B2 * | 8/2010 | Cloft et al. | 244/208 |
| 7,811,049 | B2 * | 10/2010 | Xu | 415/54.1 |
| 7,870,721 | B2 * | 1/2011 | Winter et al. | 60/226.1 |
| 2005/0226717 | A1 * | 10/2005 | Xu | 415/58.5 |
| 2009/0044543 | A1 * | 2/2009 | Clemen et al. | 60/785 |
| 2009/0232636 | A1 * | 9/2009 | Grauer | 415/58.5 |

FOREIGN PATENT DOCUMENTS

WO     95/10692     4/1995

\* cited by examiner

*Primary Examiner* — William H Rodriguez
(74) *Attorney, Agent, or Firm* — Carlson, Gaskey & Olds PC

(57) ABSTRACT

A turbofan flow delivery system includes a fan case housing a fan. Flow exit guide vanes are arranged downstream from the fan and extend radially inwardly from the fan case toward a bypass flow path. A supply passage includes an opening provided in the fan case between the fan and flow exit guide vanes configured to selectively provide pressurized air to a component using air from the bypass flow path. Swirling air from the bypass flow path enters the supply passage and is converted to a static pressure.

2 Claims, 1 Drawing Sheet

TANGENTIAL ANTI-SWIRL AIR SUPPLY

BACKGROUND

This application relates to a turbofan engine and flow delivery system.

Turbine engines typically use bleed air from the core, for example, for supplying pressurized air to a turbine engine component. Extracting bleed air from the core is costly since diverting air to which work has been done reduces the efficiency of the turbine engine. Thus, it is desirable to bleed air from the earliest stage within the core having sufficient pressure for the component and that does not compromise operation of the turbine engine.

Some turbine engines have employed systems that provide bleed air from the fan case. Typically, the air is bled aft of the fan exit guide vanes where the bypass air flow has been straightened and moves in an axial direction. This type of system requires the fan case to be extended axially to accommodate a bleed air inlet scoop. Generally, the weight and cost penalties due to the increased axial length are not desirable.

What is needed is a bleed air flow delivery system that does not increase the weight or cost of the turbine engine.

SUMMARY

A turbofan flow delivery system includes a fan case housing a fan. Flow exit guide vanes are arranged downstream from the fan and extend radially inwardly from the fan case toward a bypass flow path. A supply passage includes an opening provided in the fan case between the fan and flow exit guide vanes configured to selectively provide pressurized air to a component using air from the bypass flow path. Swirling air from the bypass flow path enters the supply passage and is converted to a static pressure. A valve is arranged in the supply passage in one example and is rotated between open and closed positions by an actuator in response to a controller. The valve selectively provides pressurized air to the component.

These and other features of the application can be best understood from the following specification and drawings, the following of which is a brief description.

DETAILED DESCRIPTION OF THE PREFERRED EMBODIMENT

Figure 1:
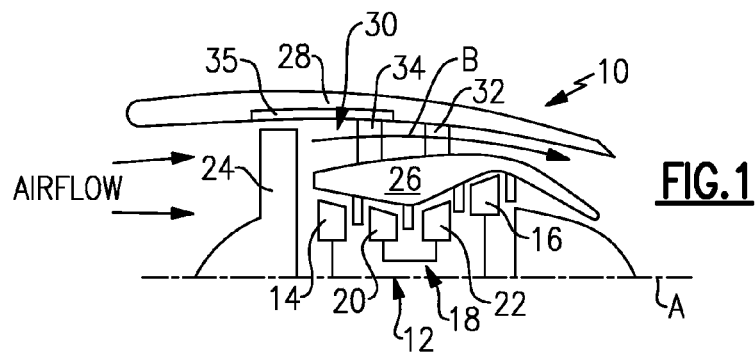
FIG. 1 is a highly schematic view of an example turbine engine.

One type of turbine engine 10 is shown schematically in FIG. 1. However, it should be understood that the application relates to any type of turbofan engine configuration. The example turbine engine 10 includes a low spool 12 having a low pressure compressor and turbine 14, 16. In the example, a fan 24 is also driven by the low spool 12. The turbine engine 10 also includes a high spool 18 having a high pressure compressor and turbine 20, 22. The low and high spools 12, 18 rotate about an axis A.

The low and high spools 12, 18 are housed within a core nacelle 26. The core nacelle 26 and fan 24 are arranged within a fan nacelle 28. A bypass flow path 30 is provided between the core and fan nacelles 26, 28 through which bypass flow B passes before exiting the turbine engine 10. In some turbofan arrangements, one or more bifurcations 32 extend between the core and fan nacelles 26, 28 and house various wires and fluid conduits. Multiple flow exit guide vanes (FEGV) 34 are arranged circumferentially about the axis A and downstream from the fan 24 to straighten the bypass flow B. Typically, a fan case 35 surrounds the fan 24 and FEGV 34, which extend radially inwardly from the fan case 35. Upstream from the FEGV 34, the bypass flow B can have significant swirl about the axis A in the annular space provided by the bypass flow path 30.

Figure 2:
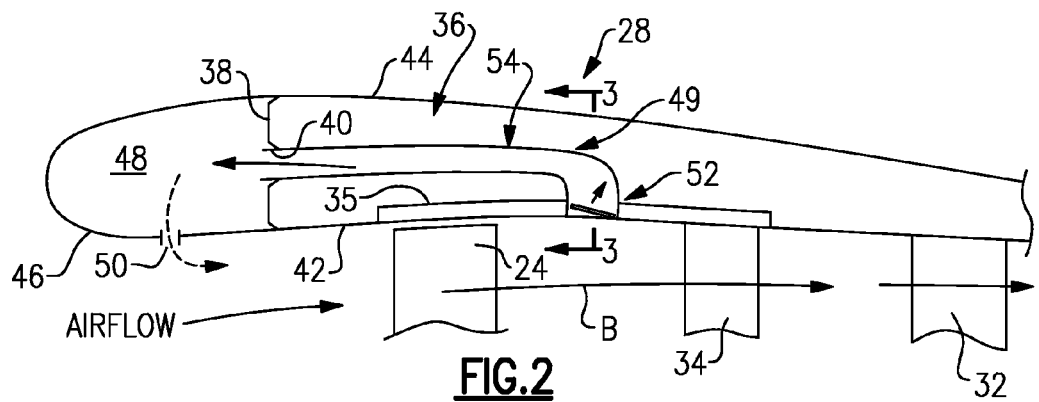
FIG. 2 is an enlarged cross-sectional view of a nacelle shown in FIG. 1.

A flow delivery system is provided that takes advantage of the swirl of the bypass flow B upstream from the FEGV 34 to reduce the use of bleed air extracted from the core for various purposes. Referring to FIG. 2, the fan nacelle 28 includes a bulkhead 38 arranged within a cavity 36 to support inner and outer surfaces 42, 44 of the fan nacelle 28. A supply passage 49 receives swirling bypass flow B and converts it to pressurized air for use by a component.

In one example, the supply passage 49 supplies pressurized air to a pressure vessel 48 provided at a portion of the fan nacelle 28 forward of the bulkhead 38. The pressure vessel 48 provides air through multiple apertures 50 in the inner surface 42 to induce a boundary layer that reduces flow separation at the inlet 46, for example.

Figure 3:
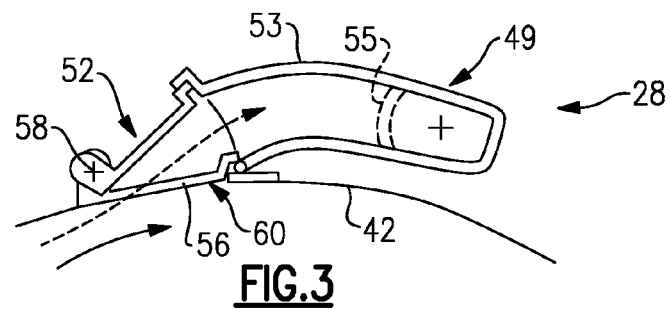
FIG. 3 is a cross-sectional view of the nacelle shown in FIG. 2, taken along line 3-3.

Referring to FIGS. 2 and 3, the supply passage 49 includes an inlet scoop 52 supported by the fan case 35 that receives the swirling bypass flow B. A tube 54 extends from the inlet scoop 52 through a hole 40 in the bulkhead 38, in one example. In one example, multiple supply passages 49 are arranged circumferentially within the fan nacelle 28. Of course, the supply passage 49 can be configured differently depending upon, for example, where the pressurized air is being supplied and how much flow is needed. The supply passage 49 includes a first portion 53 that receives the swirling bypass flow B from the bypass flow path 30. A second portion 55 angled relative to the first portion 53 converts the dynamic head of the bypass flow B into static pressure. In the example, the first portion 53 is arranged generally tangentially relative to the bypass flow path 30, and the second portion 55 is arranged generally axially relative to the bypass flow path 30.

Figure 4:
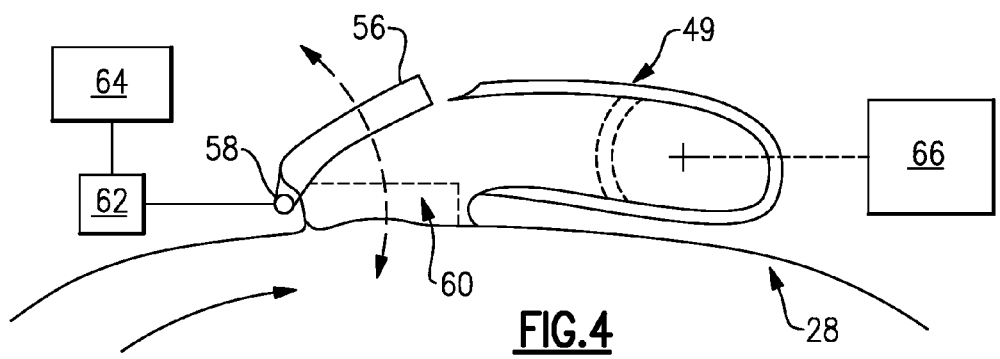
FIG. 4 is a schematic view of an example tangential anti-swirl air supply system for a turbine engine.

A valve 56 is rotatable about a pivot 62 between a closed position (FIG. 3) and an open position (FIG. 4) to selectively obstruct an opening 60 that fluidly connects the bypass flow path 30 to the supply passage 49. In the example shown in FIG. 4, an actuator 62 moves the valve 56 in response to a command from a controller 64. The valve 56 is opened when it is desirable to provide pressurized air to a component 66.

Although an example embodiment has been disclosed, a worker of ordinary skill in this art would recognize that certain modifications would come within the scope of the claims. For that reason, the following claims should be studied to determine their true scope and content.

What is claimed is:

1. A turbofan flow delivery system comprising:
   a fan case housing a fan, and flow exit guide vanes downstream from the fan and extending radially inwardly from the fan case toward a bypass flow path;
   a supply passage having an opening provided in the fan case between the fan and flow exit guide vanes configured to selectively provide static pressurized air to a component using air from the bypass flow path;

a fan nacelle surrounding the fan case, the supply passage arranged within the fan nacelle, wherein the fan nacelle includes a bulkhead supporting a portion of the supply passage within a cavity provided between inner and outer surfaces of the fan nacelle; and wherein the cavity includes a pressurized vessel forward of the bulkhead, and apertures are provided in the inner surface near an inlet of the fan nacelle, the apertures in fluid communication with the pressure vessel.

2. A turbofan flow delivery system comprising:

a fan case housing a fan, and flow exit guide vanes downstream from the fan and extending radially inwardly from the fan case toward a bypass flow path;

a supply passage having an opening provided in the fan case between the fan and flow exit guide vanes configured to selectively provide static pressurized air to a component using air from the bypass flow path; and wherein the supply passage includes first and second portions at an angle relative to one another, the first portion arranged generally tangentially relative to the bypass flow path, and the second portion arranged generally axially relative to the bypass flow path and configured to convert the bypass flow to static pressure.

\* \* \* \* \*